United States Patent [19]

Martin

[11] 4,305,348
[45] Dec. 15, 1981

[54] SEAL FOR AN INTERNAL COMBUSTION ENGINE

[75] Inventor: Jon W. Martin, Los Alamitos, Calif.

[73] Assignee: Ramsey Corporation, St. Louis, Mo.

[21] Appl. No.: 953,476

[22] Filed: Oct. 23, 1978

[51] Int. Cl.³ .............................................. F02F 1/36
[52] U.S. Cl. .......................... 123/41.82 R; 123/41.72; 123/41.84
[58] Field of Search ............... 123/41.72, 41.81, 41.83, 123/41.84, 193 CH, 193 C, 191 A, 41.82 R; 92/171; 277/189, 167.3, 170

[56] References Cited

U.S. PATENT DOCUMENTS

| 1,208,744 | 12/1916 | Cannac | 123/193 C |
| 2,376,017 | 5/1945 | Smallpiece | 277/170 |
| 2,752,668 | 7/1956 | Sheen | |
| 2,786,697 | 3/1957 | Rescheneder | 277/170 |
| 2,876,987 | 3/1959 | Renfro | 277/170 |
| 3,075,817 | 1/1963 | Mayes | |
| 3,092,133 | 6/1963 | Clark | 277/167.3 |
| 3,853,099 | 12/1974 | Feather | 123/193 CH |
| 3,882,842 | 5/1975 | Bailey | 123/41.84 |

FOREIGN PATENT DOCUMENTS

| 32483 | 10/1964 | Fed. Rep. of Germany | 123/189 |
| 352888 | 9/1937 | Italy | 123/41.84 |
| 313033 | 6/1929 | United Kingdom | 123/170 |
| 548682 | 10/1942 | United Kingdom | 123/41.84 |

OTHER PUBLICATIONS

Railway Locomotives and Cars, Aug. 1955, pp. 64-68, C. G. A. Rosen.

Primary Examiner—Ronald H. Lazarus
Attorney, Agent, or Firm—Yount & Tarolli

[57] ABSTRACT

The invention relates to an internal combustion engine structure, and addresses the problem of preventing coolant and lubricant from mixing therein.

A seal structure is provided for sealing between an engine block 10 and a cylinder liner 34 in an internal combustion engine. The seal structure 40, 42 comprises an annular insert member preferably made of a high temperature resistant resinous material. The insert 100 fits in a recess 136, 134 in the engine block 98 and encircles the cylinder liner 94. A resilient seal member 110, 112, 114 in a groove 104, 106, 108 in the inner surface 130 of the insert 100 seals against the cylinder liner 94.

4 Claims, 5 Drawing Figures

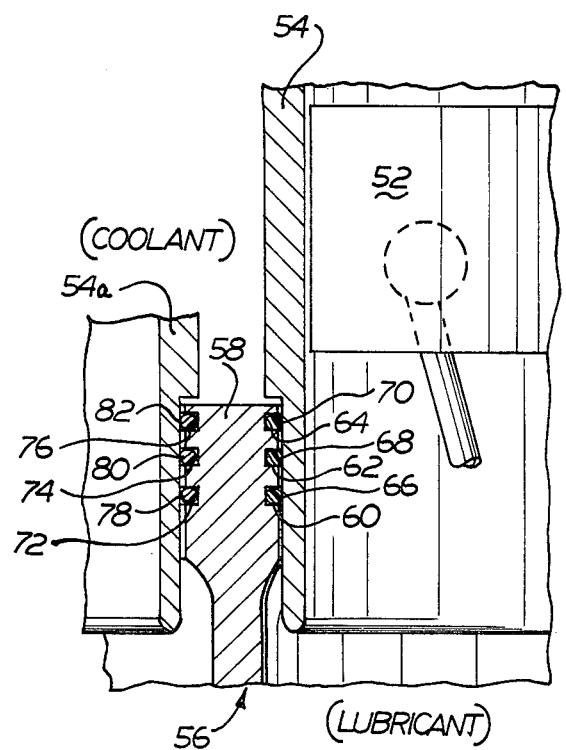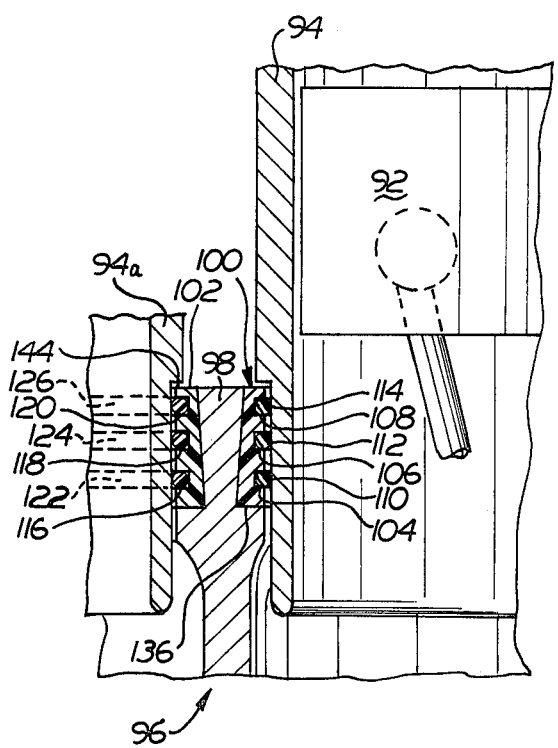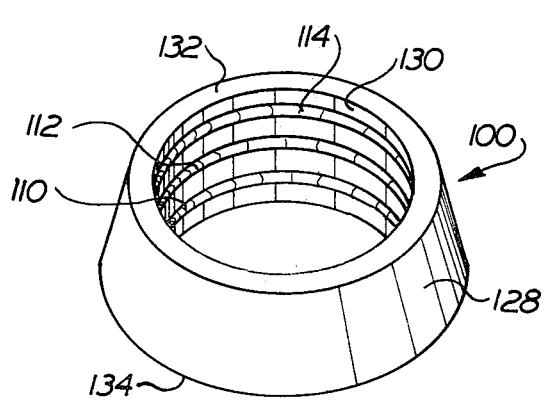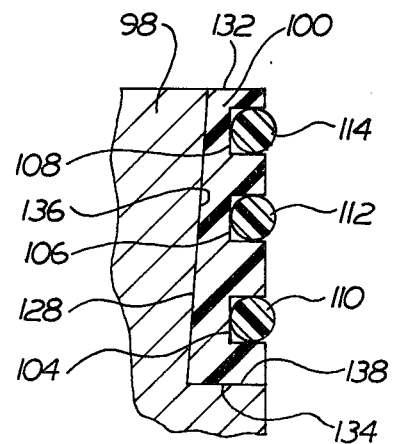

SEAL FOR AN INTERNAL COMBUSTION ENGINE

BACKGROUND AND PRIOR ART

The present invention relates to a seal structure for sealing between an engine block and a cylinder liner in an internal combustion engine, especially a compression ignition type internal combustion engine.

In the manufacture of engine blocks, particularly for diesel engines, the engine block is normally cast with relatively loose tolerances. In order to obtain a tightly fit piston in a combustion chamber, machined cylinder liners are inserted into the block, one for each cylinder. A piston operates within each cylinder liner. Circulating outside the cylinder liner are the engine coolant near the top and the engine lubricant near the bottom. Thus, the cylinder liner is called a "wet sleeve liner" because it is contacted by the coolant and the lubricant. It is, of course, necessary to provide a cylinder liner seal structure to prevent intermingling of the coolant and lubricant.

In a current design, the seal structure comprises a plurality of O-rings mounted in the engine block. The engine block is machined to provide ring grooves therein, and specifically three O-rings are used at the bottom of the cylinder liner, and three more O-rings are used at the top of the cylinder liner for sealing engagement between the cylinder liner and the engine block. Each of the three O-rings is made of a different material and the O-rings are required to be installed in a predetermined sequence. A fluorocarbon co-polymer O-ring is located in the groove next to the oil, a Neoprene O-ring is utilized in the middle groove, and an ethylene-propylene co-polymer O-ring is located in the groove next to the coolant.

Since several O-ring grooves must be machined into the engine block for each cylinder, machining becomes a costly factor. Further, in the machining, it is difficult to hold required tolerances on a production basis, and tool wear and tool chatter are problems.

The present invention substantially simplifies machining of the engine block. The present invention does not require the three grooves machined in the engine block, but still enables use of the three O-ring seals at each end of the cylinder liner.

Specifically, the present invention comprises an insert which encircles the cylinder liner and has the O-rings supported therein, which engage the periphery of the cylinder liner. The insert is preferably an injection molded, high-performance plastic insert. The O-rings are received in grooves which preferably are molded into the plastic, although the grooves may be otherwise formed.

The engine block must be adapted to receive the insert which carries the O-rings. This can be readily accomplished without the extensive machining problems aforementioned. The engine block is provided with an insert-engaging surface which lies in a plane which extends transverse to the axis of the cylinder liner. On insertion of the insert into the engine block, the insert engages the surface and, thus, the insert is axially positioned relative to the cylinder liner. Further, in order to interlock the insert in the engine block, the insert is tapered, or conical in configuration, and a corresponding tapered or conical surface is formed in the engine block. The conical surface in the engine block extends from the insert-engaging surface outwardly of the engine block.

BRIEF SUMMARY OF THE INVENTION

Briefly stated, the present invention is an apparatus for sealing between the engine block and a cylinder liner in an internal combustion engine. The apparatus includes an annular insert having an exterior surface for liquid-tight engagement, e.g., a snap-fit engagement, with surfaces in the engine block. The exterior surface of the insert may be shaped to provide an interlock between the engine block and the annular insert. The insert is provided with grooves in a cylindrical interior surface and annular resilient O-ring seals are located in the grooves for sealing engagement between the insert and the cylindrical sleeve liner. One or two insert members may be provided between each cylinder liner and the engine block, one adjacent the lower end of the liner and a second insert adjacent the cylinder head.

BRIEF DESCRIPTION OF THE DRAWINGS

Further features and advantages of the invention will become apparent from the following specification and reference to the annexed drawings in which:

FIG. 2 is a schematic representation of a prior art structure for sealing between the engine block and cylinder liner;

FIG. 3 is a schematic, fragmentary sectional view of an engine block having cylinder liner seals in accordance with the present invention;

FIG. 4 is an enlarged cross-section of a portion of the cylinder liner seal of the present invention; and FIG. 5 is a perspective view of the cylinder liner seal of the present invention.

DETAILED DESCRIPTION OF THE PREFERRED EMBODIMENT

Figure 1:
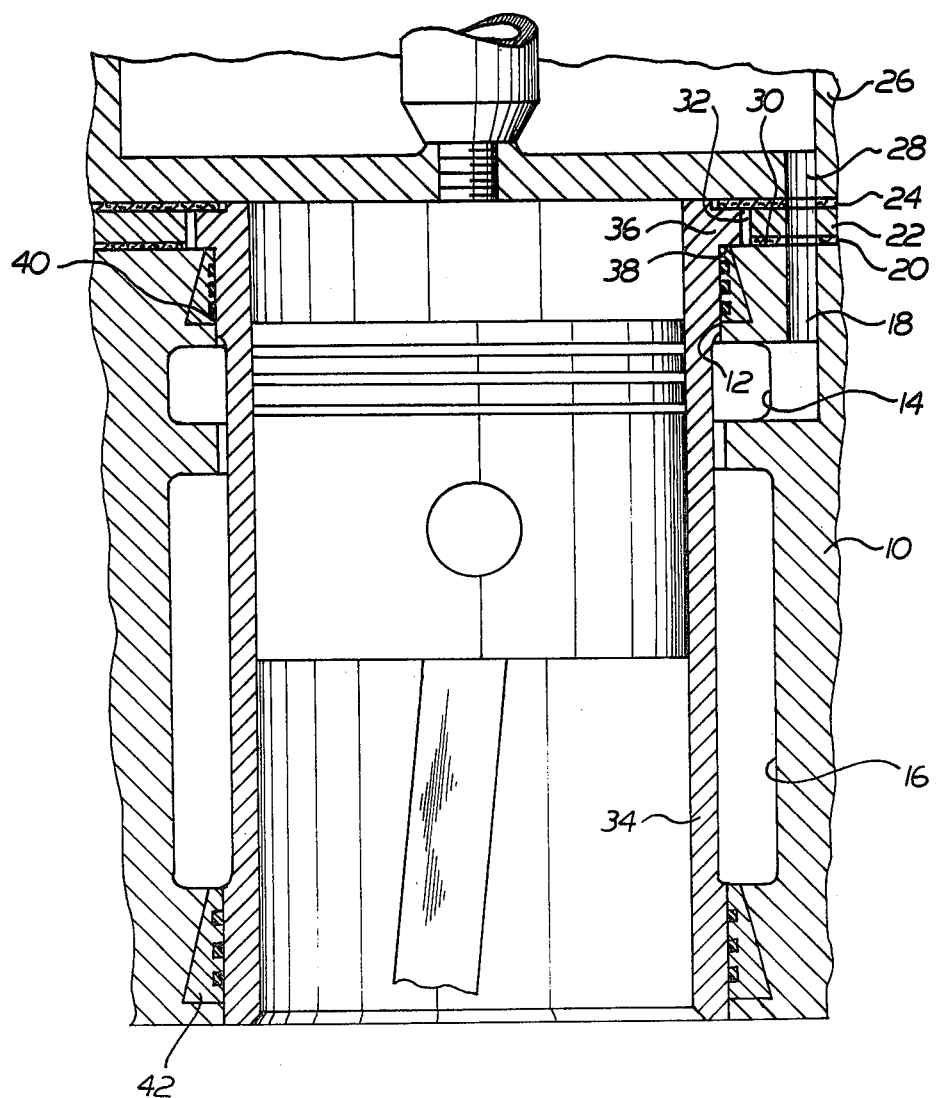
FIG. 1 is a cross-sectional view of a part of a diesel engine block showing upper and lower seals of the present invention between the engine block and the cylinder liner of a single cylinder.

As indicated above, the present invention is concerned with a seal structure to be located between a portion of the engine block of an internal combustion engine and a cylinder liner. The seal structure functions to prevent escape of liquids contained in or in contact with the engine block from their designated chambers or zones, and thus prevents possible intermixing of those liquids. The drawings illustrate a preferred embodiment of the invention and it is to be understood that modifications may be made in the illustrated embodiment without departing from the spirit of the invention.

FIG. 1 shows the present invention applied to an internal combustion engine having a cylinder block 10. The cylinder block 10 includes a plurality of cylinder bores, only one cylinder bore being shown in FIG. 1. The cylinder bore is defined in part by an annular wall 12 formed in the cylinder block 10. A cylinder liner 34 is received in the cylinder bore.

Annular chambers 14 and 16 are also defined in the cylinder block 10 and surround the cylinder liner 34. The chamber 14 and 16 form a portion of interconnected passages for circulating a coolant through the engine block 10 during its operation. A passageway 18 is provided in the engine block 10 and is aligned with openings formed through a metallic gasket 20, a spacer 22, and a head gasket 24. The cylinder head 26 is attached to the engine block 10 in a known manner, and is provided with a passageway 28 in alignment with the passageway 18. The gasket 20 and the spacer 22 are seated on a deck 30 of the engine block 10. The deck 30 has a recessed bore 32 which is slightly larger in diameter than the diameter of the cylinder bore. The cylinder 34 has an upper radial flange 36 formed thereon. The flange 36 has a shoulder surface 38 seated on the deck 30.

In accordance with the present invention, annular shaped sealing structures 40 and 42 are provided between the engine block 10 and cylinder liner 34. The seal structures will be described in detail below. The seal structures of the present invention provide a substantial advantage over the prior art. This can be appreciated after considering the prior art which is illustrated in FIG. 2.

FIG. 2 shows a portion of an internal combustion engine, similar to that shown in FIG. 1 and having a piston 52 mounted for reciprocatory movement in a cylinder liner 54. The engine block casting 56 is shown, and particularly a web portion 58 located between a pair of cylinder liners, namely liners 54, 54a. Portions of the web portion 58 are in contact with the engine coolant, and other portions are in contact with the engine lubricant as indicated by the notations on FIG. 2. A corresponding web (not shown) is provided at the upper end of the cylinder liner 54. As indicated, the coolant is disposed adjacent the cylinder liner 52 and above the web member 58. The lubricating oil is disposed below the web member 58 in the crankcase of the engine.

To prevent mixing of the coolant with the lubricating oil, the web member 58 is provided with a series of ring grooves 60, 62 and 64 in which are disposed resilient O-rings 66, 68 and 70, respectively. On the opposite side of the web member 58, a similar set of circular grooves 72, 74 and 76 is provided for the adjacent cylinder liner 54a. Resilient O-ring members 78, 80 and 82 are disposed in the grooves 72, 74 and 76, respectively, for effecting a seal between the cylinder liner 54a and the engine block web member 58 to prevent intermixing of coolant and lubricant.

The diameter of the grooves 60, 62, 64 and 72, 74 and 76 may be as much as 9.5" or more such as in marine diesel engines and diesel engines for large off-the-road machinery. As a result, machining the grooves is difficult and costly. Still further, the O-rings 66, 68 and 70 have been required to be of different materials. This is because commercially available materials are not satisfactorily compatible with both engine coolant and lubricant.

In FIG. 3, instead of ring grooves milled on the inner surfaces of the web portion of an engine block casting, as in FIG. 2, there is provided in accordance with the present invention one or more seal inserts for each cylinder liner. Two such inserts may be provided for each cylinder liner in the engine, an upper insert and a lower insert, in the manner shown in FIG. 1 at 40, 42.

In FIGS. 3 and 4, the seal insert for the cylinder liner 94 is designated 100 and the seal insert for the cylinder liner 94a is designated 102. The inserts 100, 102 are disposed in the web portion 98. The annular inserts 100, 102 are of identical construction. The insert 100 is provided with axially spaced ring grooves 104, 106, 108. The ring grooves 104, 106, 108 lie in parallel planes. Carried in the ring grooves 104, 106, 108 are resilient O-ring sealing members 110, 112 and 114. In like manner, the annular insert 102 is provided with axially spaced parallel grooves 116, 118 and 120 having disposed therein resilient O-ring sealing members 122, 124 and 126.

The inserts 100, 102 are molded resinous inserts and have a frusto-conical exterior surface 128 and a cylindrical inner surface 130. The inserts 100, 102 also have flat top and bottom radial surfaces 132, 134, respectively. The slope of the frusto-conical exterior surface 128 is less than 90° to the horizontal and preferably from 85° to 89°, e.g., 87°. The surface 128 is in tight sealing engagement with an undercut or tapered annular conical surface 136 in the engine block when assembled therewith. Also, the radial surface 134 sealingly engages an insert-engaging surface 138 on the engine block. The surface 138 lies in a plane which extends transverse to the axis of the cylinder liner. Adhesive or paste type sealer material may be applied at the interface of the surfaces 136, 128 to assure a proper seal, if desired.

The compressive stress on the O-rings 110, 112 and 114, for example also exerts a radially outwardly directed force on the insert 100. This force in combination with the frusto-conical surface 136 on the web 98, tends to cam the insert 100 downwardly so that the radial surface 134 is tightly seated on the surface 138.

The inserts 100, 102 may be cast by known procedures from a thermoplastic or thermosetting resinous material. Since the inserts 100, 102 are to be used adjacent the combustion chambers of an internal combustion engine, the resinous material of which they are fabricated must have high thermal stability and preferably be thermoplastic or have a relatively high softening point, e.g., above 300° F. The resinous material may be reinforced with an inert fibrous material, e.g., glass or asbestos, and/or with a finely divided (e.g., 200 mesh) inert filler, e.g., antimony trioxide, alumina, silica, etc.

In a preferred embodiment, the annular inserts are injection molded from poly(phenylene sulfide), a material which is commercially available from the Phillips Petroleum Company and which has a melting point of about 700° F. The grooves 104, 106 and 108, for example, are easily formed in the interior surface of the insert by any well-known molding technique including compression molding, transfer molding, and the like. Alternatively, the insert may be molded without the grooves, and the grooves 104, 106 and 108 provided by cutting, milling, grinding or otherwise shaping the inner surface of the insert 100 to provide the grooves.

Many resinous materials are available for use in fabricating the insert of the present invention. Available materials for such use include, but are not limited to, polycarbonates, polyimides, polyfluorocarbons, e.g., polytetrafluoroethylene (Teflon), phenolics, phenolic-silicone, phenyl-silanes, epoxy-melamine, silicones, silicone alkyd co-polymers, polyesters, e.g., triallyl cyanurate modified polyester alkyds. Reference may be had to "High Temperature Plastics," Brenner et al., Reinhold Publishing Company (1962) Library of Congress Catalogue, Card No. 62-13256, for examples of resins which may be used. The particular resin selected for use must have high temperature stability (300° F.) and be unaffected by lubricant and coolant materials.

The O-rings located in the grooves in the inserts 100, 102 for effecting the seal between the cylinder liners 94 and 94a and the inserts 100, 102, may be made of the same materials as O-rings of the prior art. Thus, the upper resilient seal ring 68 may be formed of a co-polymer of ethylene and propylene. The middle ring 112 may be formed of Neoprene. The bottom ring 114 may be formed of a co-polymer of hexafluoropropene and vinylidene fluoride blended with 5 to 10 percent of an ethylene-propylene resin with optionally a small amount of an unsaturated chain terminating agent. The cross-sectional configuration of the seal rings 110, 112 and 114, for example, may be circular as in O-rings, or any other suitable configuration. The rings should be sized relative to the grooves in the insert for compressive sealing engagement with the cylinder liners.

Alternatively, the O-rings could be made of certain elastomer materials which undergo some swelling upon contact with coolant or with mineral oil base lubricants. This property can be used to advantage in the present invention. For example, it has been found that the blending of a relatively low amount of ethylene-propylene terpolymer rubber into the co-polymer of hexafluoropropene and vinylidene fluoride provides for controlled swelling of the blended resins with a little or no sacrifice in other desirable properties. For example, a peroxide cured co-polymer of hexafluoropropene and vinylidene fluoride produced in accordance with the teachings of U.S. Pat. No. 3,519,703, intimately blended with 5 parts per 100 parts of resin (phr) of ethylene propylene terpolymer rubber (EPDM) shows a 10 percent by volume swell at equilibrium in a commercial hydraulic fluid. When the same co-polymer is blended with 10 parts per 100 parts of resin with ethylene propylene terpolymer, the percent volume of swell at equilibrium in the same hydraulic fluid is about 30 percent. Thus, the degree of swelling of the copolymer can be controlled by blending it with a small amount of an ethylene propylene terpolymer rubber.

As indicated above, it may be desired that the seal rings, when in place in the engine, should swell upon contact with the adjacent fluid whether it be the coolant (an example of which is an aqueous solution ethylene glycol) or in contact with a mineral lubricating oil in the crankcase. With the above type of polymers, it is conceivable that a single material can be used for sealing in contact with both liquids, and the swelling thereof can be controlled to a predetermined amount by the amount of ethylene-propylene rubber, or ethylene-propylene terpolymer rubber blended therewith. Controlled swelling is a desired property, since this aids in establishing an effective seal for the different liquids. From 5–40 parts phr of the EPR may be used to effect controlled swelling with respect to the different liquids encountered in an internal combustion engine, e.g., a diesel engine.

The surfaces 136, 138 in the engine block are readily formed. A recess defined by the surfaces 136, 138 may be cast into the engine block. The surfaces may be smoothed or finished by a single machining operation, if desired. The surface 136 is desirably conical and conforms to the exterior surface 128 of the insert. The surface 136 may be cylindrical in which case the exterior surface 128 of the insert 100 will be cylindrical. Although the resinous annular inserts 100, 102 are relatively rigid in comparison with rubber, they have sufficient flexibility that upon slight twisting and/or stretching, they can be snap-fit into place in the engine block. The insert when fit into place is effectively mechanically held or interlocked with the engine block, and specifically the surfaces 136,138 prevent axial movement of the insert in the engine block.

An alternative to the mechanical interlock would be to adhesively bond the inserts in the engine block. To do so, the surface 136 and 138 preferably would be ground smooth and a thermally resistant adhesive material or sealing material, e.g., "Permatex," applied at the interface, between the surfaces and the insert 100, for example. Epoxy adhesive, acrylonitrile adhesive, etc., may be used. In this manner, an adhesive interlocked relationship between the resinous insert and the engine block can be established.

Replacement of the inserts, when it becomes necessary, is possible. The old insert can be fractured with a cold chisel and readily cleaned out of the engine block, and a new insert fitted into place.

STATEMENT OF INDUSTRIAL APPLICABILITY

The apparatus of the present invention is applicable to internal combustion engines, particularly diesel engines, and especially those diesel engines having large diameter cylinders such as used in marine engines, locomotive and stationary diesel-electric engines, truck engine, large off-the-road earth moving engines, and the like.

What is claimed is:

1. Apparatus comprising an engine block having an aperture therein, a cylindrical combustion chamber cylinder liner received in said aperture, said engine block in part defining separate chambers for coolant and lubricant, respectively, a seal structure coacting between said cylinder liner and said engine block to prevent intermixing of coolant and lubricant, said seal structure comprising an annular insert having a conical exterior surface extending between a narrow axial end and a wide axial end of said annular insert, said conical exterior surface engaging a complementary configured conical surface in said engine block, said insert also having an interior surface with is generally cylindrical, said annular insert further having a pair of axial end surfaces which extend parallel to each other and perpendicular to the axis of said interior surface at the opposite ends of said conical surface, said engine block having a ledge surface extending transverse to said axis of said interior surface, the end surface of said annular insert at said wide end of said annular insert engaging said ledge surface, at least one annular resilient seal member in a circumferential seal groove formed in said interior surface for resilient sealing engagement with said cylinder liner, said annular resilient seal member exerting a radially outwardly directed force to enhance the sealing engagement of said conical exterior surface of said annular insert with said configure conical surface in said engine block, the diameter of said aperture and the outer diameter of said annular insert at said narrow end being substantially equal, and said annular insert being resiliently deformable to enable said wide end of said annular insert to be moved through said aperture to position said end surface at the wide end of said insert in engagement with said ledge surface.

2. Apparatus as defined in claim 1 wherein said annular insert is made of an organic resinous material having a softening point above 300° F.

3. Apparatus as defined in claim 1 wherein said annular insert has a plurality of axially spaced circumferential seal grooves formed in said interior surface, and an annular resilient seal member is located in each of said plurality of axially spaced circumferential grooves.

4. Apparatus as defined in claim 1 wherein said ring-shaped body has surfaces defining three parallel circumferential grooves in said interior surface, each of said grooves having an O-ring seal member therein sealingly engaging said body and said cylinder liner, the O-ring in the lower groove being formed from a co-polymer of hexafluoropropene and vinylidene fluoride blended with 5%–10% ethylene-propylene terpolymer rubber, the middle O-ring being formed from Neoprene, and the upper O-ring being formed from a co-polymer of ethylene and propylene.

* * * * *

UNITED STATES PATENT AND TRADEMARK OFFICE
CERTIFICATE OF CORRECTION

PATENT NO. : 4,305,348

DATED : December 15, 1981

INVENTOR(S) : Jon W. Martin

It is certified that error appears in the above-identified patent and that said Letters Patent are hereby corrected as shown below:

Column 6, line 33, change "complementary" to --complementarily--.

Column 6, lines 65 and 66, change "ring-shaped body" to --annular insert--.

Column 7, line 1, change "body" to --annular insert--;

line 2, delete the word "lower";

line 2, after the word "groove" add --at one end of said annular insert--.

Column 8, line 1, change "Neoprene" to --neoprene--;

line 2, delete the word "upper";

line 2, after "O-ring" add --in the groove at the other end of said annular insert--.

Signed and Sealed this

Twenty-ninth Day of June 1982

[SEAL]

Attest:

GERALD J. MOSSINGHOFF

Attesting Officer   Commissioner of Patents and Trademarks